US009950953B2

(12) United States Patent
Kuo et al.

(10) Patent No.: US 9,950,953 B2
(45) Date of Patent: Apr. 24, 2018

(54) FUNCTIONALIZED POLYAMINES FOR CLAY MITIGATION

(75) Inventors: Lawrence L. Kuo, Acton, MA (US); Cedrick Favero, Saint Romain le Puy (FR); Christophe Roux, Saint Just Saint Rambert (FR); Nathan A. Tregger, Billerica, MA (US)

(73) Assignees: GCP Applied Technologies Inc., Cambridge, MA (US); SNF S.A.S. (FR)

( * ) Notice: Subject to any disclaimer, the term of this patent is extended or adjusted under 35 U.S.C. 154(b) by 0 days.

(21) Appl. No.: 14/378,158

(22) PCT Filed: May 11, 2012

(86) PCT No.: PCT/EP2012/058830
§ 371 (c)(1),
(2), (4) Date: Oct. 6, 2014

(87) PCT Pub. No.: WO2013/124003
PCT Pub. Date: Aug. 29, 2013

(65) Prior Publication Data
US 2015/0065614 A1    Mar. 5, 2015

Related U.S. Application Data

(60) Provisional application No. 61/601,730, filed on Feb. 22, 2012.

(51) Int. Cl.
| | | |
|---|---|---|
| C04B 16/04 | (2006.01) | |
| C04B 24/12 | (2006.01) | |
| C04B 24/26 | (2006.01) | |
| C04B 40/00 | (2006.01) | |
| C04B 20/02 | (2006.01) | |
| C09K 8/18 | (2006.01) | |
| C09K 8/467 | (2006.01) | |
| C08G 73/02 | (2006.01) | |
| C08L 79/02 | (2006.01) | |

(52) U.S. Cl.
CPC ............ *C04B 16/04* (2013.01); *C04B 20/023* (2013.01); *C04B 24/121* (2013.01); *C04B 24/2652* (2013.01); *C04B 40/0039* (2013.01); *C08G 73/022* (2013.01); *C08G 73/0226* (2013.01); *C08L 79/02* (2013.01); *C09K 8/18* (2013.01); *C09K 8/467* (2013.01); *C09K 2208/12* (2013.01)

(58) Field of Classification Search
CPC ..... C04B 16/04; C04B 20/023; C04B 24/121; C04B 24/2652; C08G 73/022; C08L 79/02; C09K 8/18; C40B 40/0039
See application file for complete search history.

(56) References Cited

U.S. PATENT DOCUMENTS

| | | |
|---|---|---|
| 3,377,274 A | 4/1968 | Burke et al. |
| 3,501,424 A | 3/1970 | Ikari et al. |
| 3,725,312 A * | 4/1973 | Panzer ..................... C02F 1/52 210/736 |
| 3,738,945 A * | 6/1973 | Dixon et al. .............. C02F 1/54 210/736 |
| 4,158,521 A | 6/1979 | Anderson et al. |
| 4,167,393 A | 9/1979 | de Roo |
| 4,250,112 A | 2/1981 | Lobach et al. |
| 4,271,053 A * | 6/1981 | Kelsey ................... A01N 33/12 524/610 |
| 4,366,073 A | 12/1982 | McLaughlin et al. |
| 4,393,939 A | 7/1983 | Smith et al. |
| 4,447,342 A | 5/1984 | Borchardt et al. |
| 4,460,483 A | 7/1984 | Weaver |
| 4,471,100 A | 9/1984 | Tsubakimoto et al. |
| 4,749,444 A | 6/1988 | Lorz et al. |
| 5,099,923 A | 3/1992 | Aften et al. |
| 5,342,530 A | 8/1994 | Aften et al. |
| 5,393,343 A | 2/1995 | Darwin et al. |
| 5,661,206 A | 8/1997 | Tanaka et al. |
| 6,352,952 B1 | 3/2002 | Jardine et al. |
| 6,551,457 B2 | 4/2003 | Westman et al. |
| 6,569,234 B2 | 5/2003 | Yamashita et al. |
| 6,670,415 B2 | 12/2003 | Jardine et al. |

(Continued)

FOREIGN PATENT DOCUMENTS

| | | | |
|---|---|---|---|
| EP | 0541490 | * 11/1992 | ............. C08F 20/60 |
| EP | 0819651 A1 | 1/1998 | |

(Continued)

OTHER PUBLICATIONS

International Search Report and Written Opiniion dated Nov. 6, 2012 in corresponding PCT application No. PCT/EP2012/058830.

(Continued)

*Primary Examiner* — John E Uselding

(74) *Attorney, Agent, or Firm* — Nields, Lemack & Frame, LLC

(57) ABSTRACT

The present invention provides methods and compositions for treating clay-bearing aggregates, particularly those used for construction purposes, whereby inclusion of fines is maximized due to minimization of clay washing which tends to remove such fines, and whereby performance of the aggregate-containing construction material is enhanced. Exemplary methods comprise introducing to clay a water-soluble, functionalized polyamine comprising a water-soluble polyamine formed by reacting an amine compound with an epoxy compound, the polyamine thus reacted being functionalized through the use of certain halide, sulfate, or epoxy compounds.

19 Claims, No Drawings

(56) References Cited

U.S. PATENT DOCUMENTS

| | | |
|---|---|---|
| 8,425,680 B2 | 4/2013 | Jacquet et al. |
| 8,834,626 B2 | 9/2014 | Jacquet et al. |
| 2004/0238138 A1 | 12/2004 | Ishizaki et al. |
| 2007/0261849 A1 | 11/2007 | Valenziano et al. |
| 2007/0287794 A1 | 12/2007 | Alain et al. |
| 2008/0060556 A1 | 3/2008 | Jacquet et al. |
| 2011/0257435 A1* | 10/2011 | Favero .................... C02F 1/56 564/291 |
| 2012/0316267 A1 | 12/2012 | Jacquet et al. |

FOREIGN PATENT DOCUMENTS

| | | |
|---|---|---|
| EP | 1418194 A1 | 5/2004 |
| EP | 1799624 B1 | 11/2011 |
| EP | 1838643 B1 | 11/2011 |
| WO | 85/01935 A1 | 5/1985 |
| WO | 03/016379 A1 | 2/2003 |
| WO | 2009/127893 A1 | 10/2009 |
| WO | 2010/005117 A1 | 1/2010 |
| WO | 2010/112784 A1 | 10/2010 |

OTHER PUBLICATIONS

International Preliminary Report on Patentability dated Sep. 4, 2014 in corresponding PCT application No. PCT/EP2012/058830.
Office action dated Jan. 3, 2018 in co-pending U.S. Appl. No. 15/805,638.

* cited by examiner

FUNCTIONALIZED POLYAMINES FOR CLAY MITIGATION

FIELD OF THE INVENTION

This invention relates to the treatment of sand aggregates used for making construction materials, and more particularly to the mitigation of clay in construction aggregates using a functionalized polyamine as will be further described in detail.

BACKGROUND OF THE INVENTION

Clay materials are often present in construction materials such as concrete, mortar, asphalt, road base, and gas and oil well drilling mud (used for cementing the annulus gap between pipe and well bore) due to their presence in sand, crushed rock or gravel, and other aggregate materials which are typically used in construction applications. Having a lamellar structure, clay can absorb water and chemical agents, resulting in decreased performance of the construction materials. A common method to mitigate the deleterious effect of clays is to wash them from the aggregates. However, beneficial fines can also be removed during washing.

It is known to use quaternary amine compounds for modifying properties or characteristics of clays. For example, in U.S. Pat. Nos. 6,352,952 and 6,670,415 (owned by W. R. Grace & Co.-Conn.), Jardine et al. disclosed that quaternary amines could be used to minimize the adverse effect of clays on dosage efficiency of superplasticizers used in concretes manufactured using sand aggregates that contained such clays.

As another example, in U.S. patent application Ser. No. 11/575,612 (Publ. No. 2007/0287794 A1) and U.S. patent application Ser. No. 11/575,607 (Publ. No. 2008/0060556 A1), assigned to Lafarge S. A., Jacquet et al. disclosed compositions for "inerting" clays in aggregates which included quaternary amine functional groups, such as diallyldialkyl ammonium, quaternized (meth)acrylates of dialkylaminoalkyl and (meth)acrylamides N-substituted by a quaternized dialkylaminoalkyl. Included among these groups were cationic polymers obtained by polycondensation of dimethylamine and epichlorohydrin. Similar compositions were disclosed by Brocas in World Intellectual Property Organization Application (Publ. No. 2010/112784 A1), also assigned to Lafarge S. A.

This invention is related to a method and composition using a functionalized polyamine for mitigating detrimental effects of clays while leaving beneficial fines. One objective of the present invention, therefore, is to mitigate the deleterious effects of clays while improving properties of the construction materials. Advantages of this invention include the improvement of mortar and concrete properties (e.g., workability, strength), asphalt properties (e.g., binder demand), and road base properties (e.g., improved flowability). As a result, washing can be reduced or eliminated, and this allows for a greater content of beneficial fines (i.e., small aggregates) to remain in the construction material.

Additional benefits can also be realized for clay stabilization in gas and oil well applications (involving fractured rock formations) to reduce water loss.

SUMMARY OF THE INVENTION

The present invention relates to clay-mitigation methods and compositions which are believed to be useful in modifying clays that are carried or otherwise mixed within inorganic particulates such as sand aggregates, crushed stone (gravel, rocks, etc.), granulated slag, and other inorganic particulate materials useful in construction materials.

The clay-mitigation agents of the present invention may be incorporated into clay-bearing construction aggregates and materials, such as mortar, concrete, asphalt, road base, or well bore drilling fluids and muds. The clay mitigation agents may be introduced into dry or wet aggregates.

In the case of hydratable cementitious compositions, the clay-mitigation methods and compositions of the present invention can provide improved workability without increasing water demand; and, in the case of treating or washing aggregate materials, the inventive compositions can reduce the effort required for washing and/or disposing of clay contained in the aggregates.

An exemplary method of the present invention for mitigating clay comprises: introducing to clay contained in aggregates (e.g., mortar or concrete aggregates, asphalt aggregates, road base aggregates), in an amount of 0.1% to 100% by weight based on dry weight of the clay contained in said aggregates, a water-soluble functionalized polyamine comprising a water-soluble polyamine formed by reacting at least one of the amine compounds represented by the structural formulae (A) through (C) below with an epoxy compound represented by the structural formula (D) below:

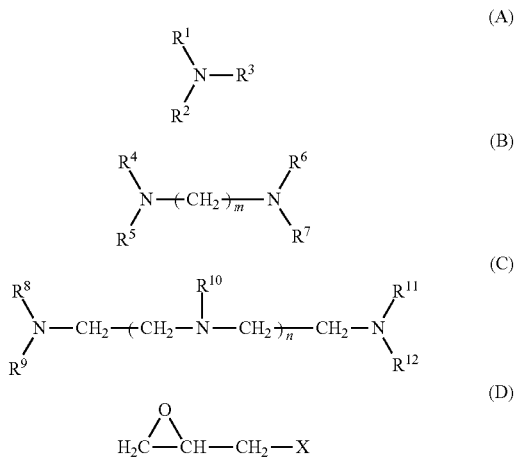

wherein $R^1$ to $R^{12}$ each independently represent hydrogen or a $C_1$ to $C_3$ alkyl group; "m" and "n" each independently represent an integer of 1 to 6; "X" represents chlorine, bromine, iodine atom, or mixture thereof; and the molar ratio of hydrogen bonded to nitrogen of said amine compound to the epoxy group of said epoxy compound is from 50:50 to 75:25;

wherein said water-soluble polyamine is being functionalized using at least one functionalizing agent selected from the following compounds: halide compounds represented by structural formulae (E) and (F) below; sulfate compounds represented by structural formula (G) below; epoxy compounds represented by structural formula (H) below; and dihalide compounds represented by formula (I) below

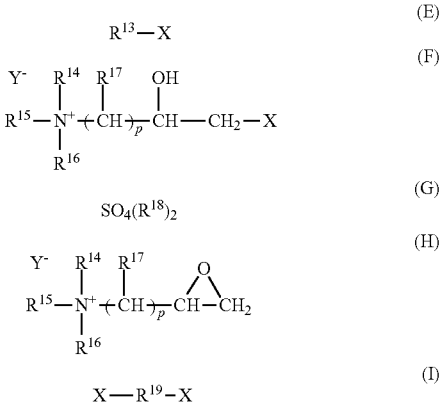

wherein $R^{13}$ to $R^{16}$ each independently represent an aliphatic or aromatic, saturated or unsaturated, $C_1$ to $C_{16}$ alkyl group; $R^{17}$ represents a hydrogen, $C_1$ to $C_5$ alkyl, hydroxyalkyl, alkylene or aryl group; $R^{18}$ represents a $C_1$ to $C_3$ alkyl group; $R^{19}$ represents a linear, branched or cyclic, $C_1$ to $C_{10}$ alkylene or arylene group, "X" represents a chlorine, bromine, iodine atom, or mixtures thereof; "$Y^-$" represents a chloride, bromide, or iodide anion; and "p" represents an integer of 1 to 16; and wherein the dry weight ratio of said polyamine to said functionalizing agent is from 99.5:0.5 to 75:25.

The present invention also provides admixture compositions containing the above-described functionalized polyamine for treating clay-bearing aggregates in combination with at least one chemical admixture conventionally used for modifying hydratable mortar or concrete, such as one or more water reducing admixtures (e.g., a polycarboxylate comb polymer superplasticizer), or other conventional admixture or admixtures, as will be further described in detail hereinafter.

Exemplary admixture compositions of the invention may be introduced to clay-bearing aggregates at or after the quarry or processing at an aggregates mine, or at the concrete mix plant, where the aggregates are combined with cement to provide mortar or concrete compositions. They may also be introduced into crushed stone or rock which is contaminated with clay, such as crushed gravel or rocks from quarries which are prepared for road base or other construction use (e.g., foundations), and other construction applications.

The above-described water-soluble functionalized polyamine can also be used, in other construction methods, such as in wellbore drilling applications, such as servicing wellbores using a wellbore servicing fluid, e.g., wellbore drilling (mud) fluid, mud displacement fluid, and/or wellbore cementing composition, to inhibit the swelling of argillaceous (shale or clay) containing subterranean formation penetrated by the wellbore, as hereinafter described in further detail.

Further advantages and benefits of the invention are described in further detail hereinafter.

DETAILED DESCRIPTION OF PREFERRED EMBODIMENTS

The present invention relates to methods and compositions for treating clays contained in aggregates such as sand, crushed rock, crushed gravel, drilling mud, and other clay-bearing aggregates, which are used in or as part of construction materials. Exemplary compositions of the invention include aggregate compositions, road base, and asphalts, as well as cementitious compositions containing aggregates, such as mortars and concretes.

The present invention relates to treatment of all types of clays. The clays may include but are not limited to swelling clays of the 2:1 type (such as smectite type clays) or also of type 1:1 (such as kaolinite) or of the 2:1:1 type (such as chlorite). The term "clays" has referred to aluminum and/or magnesium silicates, including phyllosilicates having a lamellar structure; but the term "clay" as used herein may also refer to clays not having such structures, such as amorphous clays. The present invention is also not limited to clays which absorb polyoxyalkylene superplasticizers (such as ones containing ethylene oxide ("EO") and/or propylene oxide ("PO") groups), but it also includes clays that directly affect the properties of construction materials, whether in their wet or hardened state. Clays which are commonly found in sands include, for example, montmorillonite, illite, kaolinite, muscovite, and chlorite. These are also included in the methods and compositions of the present invention.

Clay-bearing sands and/or crushed rock or gravel which are treated by the method of the present invention may be used in cementitious materials, whether hydratable or not, and such cementitious materials include mortar, concrete, and asphalt, which may be used in structural building and construction applications, roadways, foundations, civil engineering applications, as well as in precast and prefabrication applications.

The term "sand" as used herein shall mean and refer to aggregate particles usually used for construction materials such as concrete, mortar, and asphalt, and this typically involves granular particles of average size between 0 and 8 mm (e.g., not including zero), and, more preferably, between 2 and 6 mm. Sand aggregates may comprise calciferous, siliceous or siliceous limestone minerals. Such sands may be natural sand (e.g., derived from glacial, alluvial, or marine deposits which are typically weathered such that the particles have smooth surfaces) or may be of the "manufactured" type, which are made using mechanical crushers or grinding devices.

The term "cement" as used herein includes hydratable cement and Portland cement which is produced by pulverizing clinker consisting of hydraulic calcium silicates and one or more forms of calcium sulfate (e.g., gypsum) as an interground additive. Typically, Portland cement is combined with one or more supplemental cementitious materials, such as Portland cement, fly ash, granulated blast furnace slag, limestone, natural pozzolans, or mixtures thereof, and provided as a blend. The term "cementitious" refers to materials that comprise Portland cement or which otherwise function as a binder to hold together fine aggregates (e.g., sand), coarse aggregates (e.g., crushed stone, rock, gravel), or mixtures thereof.

The term "hydratable" is intended to refer to cement or cementitious materials that are hardened by chemical interaction with water. Portland cement clinker is a partially fused mass primarily composed of hydratable calcium silicates. The calcium silicates are essentially a mixture of tricalcium silicate ($3CaO.SiO_2$ "$C_3S$" in cement chemists notation) and dicalcium silicate ($2CaO.SiO_2$, "$C_2S$") in which the former is the dominant form, with lesser amounts of tricalcium aluminate ($3CaO.Al_2O_3$, "$C_3A$") and tetracalcium aluminoferrite ($4CaO.Al_2O_3.Fe_2O_3$, "$C_4AF$"). See e.g., Dodson, Vance H., *Concrete Admixtures* (Van Nostrand Reinhold, New York N.Y. 1990), page 1.

The term "concrete" will be used herein generally to refer to a hydratable cementitious mixture comprising water, cement, sand, usually a coarse aggregate such as crushed stone, rock, or gravel, and optional chemical admixture(s).

It is contemplated that one or more conventional chemical admixtures may be used in the methods and compositions of the present invention. These include, without limitation, water reducing agents (such as lignin sulfonate, naphthalene sulfonate formaldehyde condensate (NSFC), melamine sulfonate formaldehyde condensate (MSFC), polycarboxylate comb polymers (containing alkylene oxide groups such as "EO" and/or "PO" groups), gluconate, and the like); set retarders; set accelerators; defoamers; air entraining agents; surface active agents; and mixtures thereof.

Of the admixtures, the EO-PO type polymers, which have ethylene oxide ("EO") and/or propylene oxide ("PO") groups and polycarboxylate groups, are preferred. Cement dispersants contemplated for use in methods and compositions of the invention include EO-PO polymers and EO-PO comb polymers, as described for example in U.S. Pat. Nos. 6,352,952 B1 and 6,670,415 B2 of Jardine et al., which mentioned the polymers taught in U.S. Pat. No. 5,393,343 (assigned to W. R. Grace & Co.-Conn.). These polymers are available from Grace Construction Products, Massachusetts, USA, under the trade name ADVA®. Another exemplary cement dispersant polymer, also containing EO/PO groups, is obtained by polymerization of maleic anhydride and an ethylenically-polymerizable polyalkylene, as taught in U.S. Pat. No. 4,471,100. In addition, EO/PO-group-containing cement dispersant polymers are taught in U.S. Pat. Nos. 5,661,206 and 6,569,234. The amount of such polycarboxylate cement dispersants used within concrete may be in accordance with conventional use (e.g., 0.05% to 0.25% based on weight of active polymer to weight of cementitious material).

Thus, exemplary admixture compositions of the invention comprise at least one chemical admixture, such as one or more polycarboxylate cement dispersants, which is/are preferably polycarboxylate comb polymer(s) having EO and/or PO groups, in combination with the water-soluble functionalized polyamine, as described herein.

As mentioned in the summary, an exemplary method of the present invention for mitigating the effects of clay in aggregates comprises: introducing to clay contained in aggregates (e.g., mortar or concrete aggregates, asphalt aggregates, road base aggregates), in an amount of 0.1% to 100% by weight based on dry weight of the clay contained in said aggregates, a water-soluble functionalized polyamine comprising a water-soluble polyamine formed by reacting at least one of the amine compounds represented by the structural formulae (A) through (C) below with an epoxy compound represented by the structural formula (D) below:

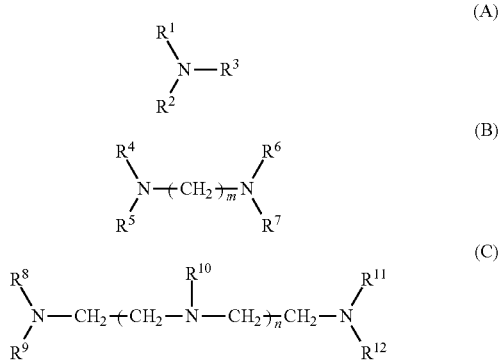

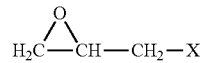

wherein $R^1$ to $R^{12}$ each independently represent hydrogen or a $C_1$ to $C_3$ alkyl group; "m" and "n" each independently represent an integer of 1 to 6; "X" represents chlorine, bromine, iodine atom, or mixture thereof; and the molar ratio of hydrogen bonded to nitrogen of said amine compound to the epoxy group of said epoxy compound is from 50:50 to 75:25;

wherein said water-soluble polyamine is being functionalized using at least one functionalizing agent selected from the following compounds: halide compounds represented by structural formulae (E) and (F) below; sulfate compounds represented by structural formula (G) below; epoxy compounds represented by structural formula (H) below; and dihalide compounds represented by formula (I) below

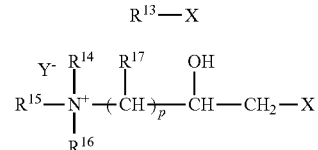

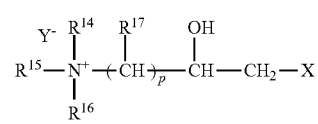

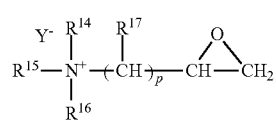

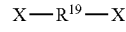

wherein $R^{13}$ to $R^{16}$ each independently represent an aliphatic or aromatic, saturated or unsaturated, $C_1$ to $C_{16}$ alkyl group; $R^{17}$ represents a hydrogen, $C_1$ to $C_5$ alkyl, hydroxyalkyl, alkylene or aryl group; $R^{18}$ represents a $C_1$ to $C_3$ alkyl group; $R^{19}$ represents a linear, branched or cyclic, $C_1$ to $C_{10}$ alkylene or arylene group, "X" represents a chlorine, bromine, iodine atom, or mixtures thereof; "Y⁻" represents a chloride, bromide, or iodide anion; and "p" represents an integer of 1 to 16; and wherein the dry weight ratio of said polyamine to said functionalizing agent is from 99.5:0.5 to 75:25.

The term "functionalized," as used herein refers to the chemical reaction of one or more functionalizing agents (or a mixture thereof) with the non-quaternized amine groups of the polyamine. Depending on the structure of the polyamine precursor, the term "functionalized" may mean quaternized, coupled, alkylated, etc. Based on the dry weight ratio of said polyamine to said functionalizing agent, their respective chemical structure and the yield of the chemical reaction, the conversion rate of the amines of said polyamine to functionalized amines may be partial or total. In another embodiment, the functionalizing agent can be added in molar excess to ensure total conversion of the amines groups and will remain in excess in the functionalized resulting polyamine.

Thus, in further exemplary embodiments of the present invention, the water-soluble polyamine, formed by combining at least one of compounds A through C with D, may be used in a mixture with a water-soluble compound selected from the "functionalizing agents" as identified in structural formulae E through I (e.g., without having to undergo a chemical reaction). Accordingly, methods of the invention for treating aggregates, admixture compositions of the invention, and cementitious compositions of the invention may comprise a mixture of the water-soluble polyamine and at least one water-soluble compound selected from compounds identified by structural formulae E through I. Such exemplary mixtures would include one or more water-soluble compounds selected from among those represented by structural formulae E through I.

A process for making cationic polyamines functionalized with an alkylating agent is described in WO 2009/127893 A1 of Favero et al. (See e.g., at page 4, identifying epichlorohydrin-dimethylamine as example of polyamine that can be functionalized with at least one alkylating agent).

According to the present invention, water-soluble functionalized polyamine are introduced to clay contained in aggregates (e.g., mortar or concrete aggregates, asphalt aggregates, road base aggregates), in the amount of 0.1 to 100% (as previously mentioned), more preferably in an amount of 1% to 50%, and most preferably in an amount of 2% to 25% by weight based on dry weight of the clay contained in said aggregates.

Thus, the first phase of making the functionalized polyamines of the present invention is first to form the water-soluble polyamine by reacting one or more amines represented by formulae A, B, and/or C (or any or all of these in combination) with an epoxy compound (represented by formula D), such as epichlorohydrin, epibromohydrin, epiiodohydrin, or a mixture thereof. Preferred among the epoxy compounds is epichlorohydrin.

In further exemplary embodiments, the water-soluble polyamine comprises an amine represented by structural formula (A), and comprises an ammonia, methylamine, ethylamine, propylamine, dimethylamine, diethylamine, dipropylamine, methyl ethyl amine, methyl propyl amine, ethyl propyl amine, or mixture thereof. Preferred is dimethylamine.

In still further exemplary embodiments, the water-soluble polyamine comprises an amine represented by structural formula (B), and comprises ethylene diamine, 1,3-propylene diamine, 1,4-butylene diamine, 1,5-pentamethylene diamine, 1,6-hexamethylene diamine, or mixture thereof. Preferred is ethylene diamine, hexamethylene diamine, or mixture thereof.

In still further exemplary embodiments, the water-soluble polyamine comprises an amine represented by structural formula (C), and comprises diethylene triamine, triethylene tetramine, tetraethylene pentamine, or mixture thereof. Preferred is tetraethylene pentamine.

As previously mentioned, the water-soluble polyamine may comprise mixtures of amines represented by formulae A, B, and C. For example, any or all of dimethylamine (formula A) and ethylene diamine (formula B) and/or tetraethylene pentamine (formula C) can be combined with one or more epoxy compounds as represented by formula D. For example, the molar ratio of an amine from formula A with an amine from formula B and/or C can be provided in a molar ratio of 99.9:0.1 to 90:10. Any combination of an amine represented by formulae B and/or C should preferably not constitute more than 10 molar percent.

In the second phase of making functionalized polyamines of the present invention, the water-soluble polyamine is functionalized using at least one functionalizing agent selected from the following compounds: halide compounds represented by structural formulae (E) and (F); sulfate compounds represented by structural formula (G); epoxy compounds represented by structural formula (H); and dihalide compounds represented by formula (I). Two or more of these compound groups may be employed.

In exemplary functionalized water-soluble polyamines, the functionalization of the polyamine is accomplished using a halide compound represented by structural formula (E), the halide compound may be selected from methyl chloride, ethyl chloride, propyl chloride, allyl chloride, benzyl chloride, or mixtures thereof. Preferred among these halide compounds are methyl chloride, benzyl chloride, or mixtures thereof.

In other preferred embodiments, the water-soluble polyamine is functionalized using a halide compound represented by structural formula (F), said sulfate compound comprising 3-chloro-2-hydroxypropyl trimethylammonium chloride, 3-chloro-2-hydroxypropyl dimethyl laurylammonium chloride, 3-chloro-2-hydroxypropyl dimethyl stearylammonium chloride, 3-chloro-2-hydroxypropyl dimethyl cocoalkylammonium chloride, or mixtures thereof. Preferred among these halide compounds is 3-chloro-2-hydroxypropyl trimethylammonium chloride.

In other exemplary embodiments, the water-soluble polyamine is functionalized using a sulfate compound represented by structural formula (G), the halide compound comprising dimethyl sulfate, diethyl sulfate, methyl ethyl sulfate, methyl propyl sulfate, or mixtures thereof. Preferred among these is dimethyl sulfate.

In other exemplary embodiments, the water-soluble polyamine is functionalized using an epoxy compound represented by structural formula (H), the epoxy compound comprising glycidyl trimethylammonium chloride, glycidyl triethylammonium chloride, glycidyl dimethyl propylammonium chloride, glycidyl dimethylhexylammonium chloride, glycidyl dipropyldecylammonium bromide, glycidyl dimethyl laurylammonium chloride, or mixtures thereof. Preferred among these epoxy compounds is glycidyl trimethylammonium chloride.

In other exemplary embodiments, the water-soluble polyamine is functionalized using a dihalide compound represented by structural formula (I), the dihalide compound comprising dichloroethane, dichloropropane, dichlorobutane, dibromoethane, dibromopropane, dibromobutane, dichlorobenzene, dibromobenzene, 1-bromo-4-chlorobenzene, or mixtures thereof. Preferred among these are dichloroethane and diromobutane.

In preferred embodiments, the weight ratio of the water-soluble polyamine to functionalizing agent is 99:1 to 85:15; and, more preferably, 99:1 to 90:10.

The water-soluble functionalized polyamine has a Brookfield viscosity of 2 to 500 centipoise (hereinafter "cP") at 50 wt % aqueous solution when measured at 60 rpm and 25° C. using Brookfield viscometer model DV-II+, spindle LV-1. More preferably, the polymer has a Brookfield viscosity of 4 to 200 cP at 50 wt % aqueous solution.

The water-soluble functionalized polyamine also preferably has a weight-average molecular weight of 2,000 to 100,000, and more preferably 5,000 to 50,000, as measured by aqueous gel permeation chromatography (GPC) with refractive index detection using poly(ethylene glycol) as standard. The GPC conditions are as follows: two TSK-gel PWXL-CO columns (G3000 and G5000), column temperature at 35° C., 0.8 wt % aqueous solution of sodium nitrate as elution solvent, injection volume of 50 μL, and flow rate of 0.6 mL/min.

The present invention also provides an aggregate composition comprising a plurality of clay-bearing aggregates selected from the group of natural and/or manufactured sand, crushed stone, crushed gravel, crushed rock, crushed shale, or mixtures thereof; and, in an amount of 0.1% to 100% by weight based on dry weight of the clay contained in said aggregates, a water-soluble functionalized polyamine comprising a water-soluble polyamine formed by reacting at least one of the amine compounds represented by the structural formulae (A) through (C) below with an epoxy compound represented by the structural formula (D) below:

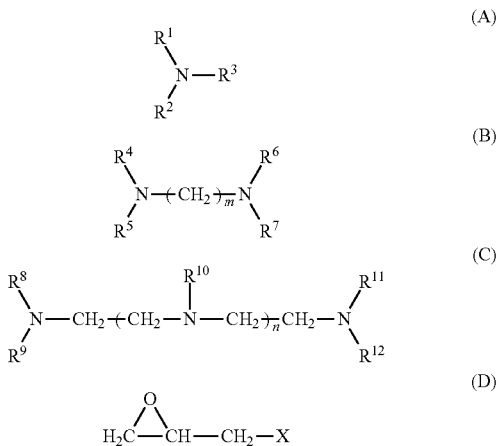

wherein $R^1$ to $R^{12}$ each independently represent hydrogen or a $C_1$ to $C_3$ alkyl group; "m" and "n" each independently represent an integer of 1 to 6; "X" represents chlorine, bromine, iodine atom, or mixture thereof; and the molar ratio of hydrogen bonded to nitrogen of said amine compound to the epoxy group of said epoxy compound is from 50:50 to 75:25;

wherein said water-soluble polyamine is being functionalized using at least one functionalizing agent selected from the following compounds: halide compounds represented by structural formulae (E) and (F) below; sulfate compounds represented by structural formula (G) below; epoxy compounds represented by structural formula (H) below; and dihalide compounds represented by formula (I) below

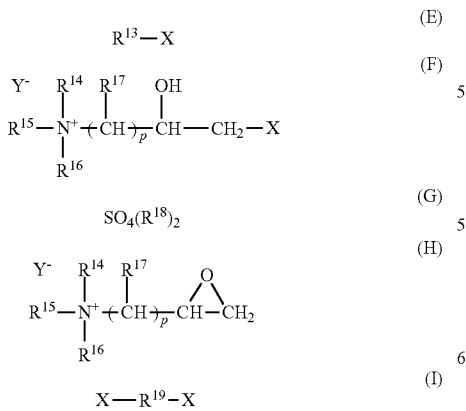

wherein $R^{13}$ to $R^{16}$ each independently represent an aliphatic or aromatic, saturated or unsaturated, $C_1$ to $C_{16}$ alkyl group; $R^{17}$ represents a hydrogen, $C_1$ to $C_5$ alkyl, hydroxyalkyl, alkylene or aryl group; $R^{18}$ represents a $C_1$ to $C_3$ alkyl group; $R^{19}$ represents a linear, branched or cyclic, $C_1$ to $C_{10}$ alkylene or arylene group, "X" represents a chlorine, bromine, iodine atom, or mixtures thereof; "$Y^-$" represents a chloride, bromide, or iodide anion; and "p" represents an integer of 1 to 16; and wherein the dry weight ratio of said polyamine to said functionalizing agent is from 99.5:0.5 to 75:25.

In further exemplary embodiments, the water-soluble functionalized polyamine is introduced to clay contained in aggregates (e.g., mortar or concrete aggregates, asphalt aggregates, road base aggregates), in an amount of 0.1-100%, more preferably 1% to 50%, and, most preferably, 2% to 25%, all percentages based on dry weight of clay contained in or on the aggregates.

It is understood that the foregoing description of an aggregate composition applies to a clay-bearing plurality of aggregates which may be in a dry pile state (e.g., located in supply piles at the mine or quarry or concrete plant; located at a preparation site for installation as road base) or may be within a wet cementitious slurry (e.g., concrete, mortar). With respect to dry aggregate compositions of the present invention containing said water-soluble functionalized polyamine (which is deposited upon or mixed into the aggregates), an exemplary method of the present invention for modifying cementitious compositions comprises combining the dry aggregate containing said water-soluble functionalized polyamine with a hydratable cement.

The present invention also provides an admixture composition for treating compositions containing clay-bearing aggregates (e.g., hydratable cementitious compositions, dry or wet aggregate piles, asphalt, etc.) comprising:

at least one chemical admixture selected from the group of water reducing agents (e.g., lignin sulfonate, naphthalene sulfonate formaldehyde condensate (NSFC), melamine sulfonate formaldehyde condensate (MSFC), polycarboxylate comb polymers (containing alkylene oxide groups such as "EO" and/or "PO" groups), gluconate, and the like); set retarders; set accelerators; defoamers; air entraining agents; surface active agents; and mixtures thereof; and a water-soluble functionalized polyamine comprising a water-soluble polyamine formed by reacting at least one of the amine compounds represented by the structural formulae (A) through (C) below with an epoxy compound represented by the structural formula (D) below:

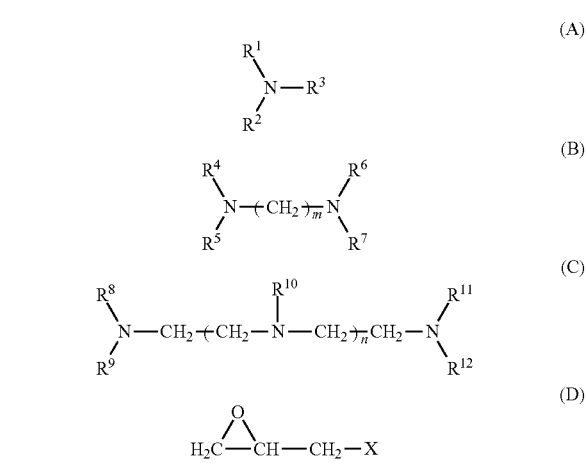

wherein $R^1$ to $R^{12}$ each independently represent hydrogen or a $C_1$ to $C_3$ alkyl group; "m" and "n" each independently represent an integer of 1 to 6; "X" represents chlorine, bromine, iodine atom, or mixture thereof; and the molar ratio of hydrogen bonded to nitrogen of said amine compound to the epoxy group of said epoxy compound is from 50:50 to 75:25;

wherein said water-soluble polyamine is being functionalized using at least one functionalizing agent selected from the following compounds: halide compounds represented by structural formulae (E) and (F) below; sulfate compounds represented by structural formula (G) below; epoxy compounds represented by structural formula (H) below; and dihalide compounds represented by formula (I) below

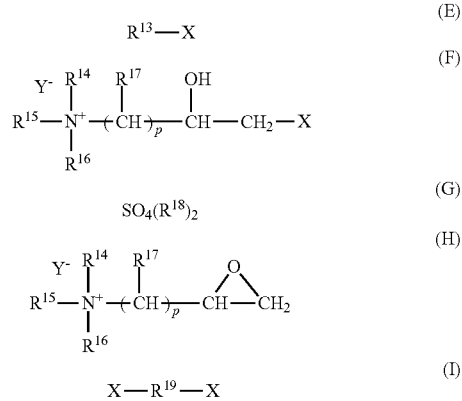

wherein $R^{13}$ to $R^{16}$ each independently represent an aliphatic or aromatic, saturated or unsaturated, $C_1$ to $C_{16}$ alkyl group; $R^{17}$ represents a hydrogen, $C_1$ to $C_5$ alkyl, hydroxyalkyl, alkylene or aryl group; $R^{18}$ represents a $C_1$ to $C_3$ alkyl group; $R^{19}$ represents a linear, branched or cyclic, $C_1$ to $C_{10}$ alkylene or arylene group, "X" represents a chlorine, bromine, iodine atom, or mixtures thereof; "Y⁻" represents a chloride, bromide, or iodide anion; and "p" represents an integer of 1 to 16; and wherein the dry weight ratio of said polyamine to said functionalizing agent is from 99.5:0.5 to 75:25.

In further exemplary embodiments, the admixture compositions comprise at least one chemical admixture selected from the group of oxyalkylene-containing water-reducing admixture, shrinkage reducing admixture, or mixture thereof, in combination with said water-soluble functionalized polyamine. Exemplary methods of the invention comprise combining said admixture compositions with a hydratable cementitious binder, either before, during, or after combining said cementitious binder with clay-bearing aggregates to create a mortar or concrete material.

For construction materials generally, the functionalized water-soluble polyamines of the present invention may be introduced to aggregates (e.g., sand) by application to the clay-bearing aggregates at the quarry or mine; by application at the concrete mix plant where the aggregates are combined with cement to form hydratable mortar or concrete; or by application at an asphalt plant wherein clay-bearing aggregates are combined with bituminous binder. The polymer may also be incorporated into the aggregates at the concrete mix plant before the cement binder is added or into dry or wet mortar or concrete containing the aggregates. Additionally, the polymer may be used together with conventional concrete admixtures such as water reducers, retarders, accelerators, superplasticizers, air detraining agents, air entraining agent, and the like.

Concerning gas and oil well applications, the functionalized water-soluble polyamines of the present invention may be introduced into the aqueous well bore cement slurry or drilling fluid or mud, which in turn stabilizes subterranean clay-bearing formations.

As mentioned in the summary, the above-described water-soluble functionalized polyamine can also be used in wellbore drilling applications, such as wellbore mud drilling fluid and/or wellbore cementing compositions and methods for servicing wellbores. As described in US 2007/0261849 of Valenziano et al., natural resources such as gas, oil, and water residing in subterranean formations or zones are usually recovered by drilling a wellbore down to the subterranean formation while circulating a drilling fluid (also known as a drilling mud) through the drill pipe and the drill bit and upwardly through the wellbore to the surface. The drilling fluid serves to lubricate the drill bit and carry drill cuttings back to the surface. After the wellbore is drilled to the desired depth, the drill pipe and drill bit are typically withdrawn from the wellbore while the drilling fluid is left in the wellbore while the drilling fluid is left in the wellbore to provide hydrostatic pressure on the formation penetrated by the wellbore and thereby prevent formation fluids from flowing into the wellbore. Next, the wellbore drilling operation involves running a string of pipe, e.g., casing, in the wellbore. Primary cementing is then typically performed whereby a cement slurry is pumped down through the string of pipe and into the annulus between the string of pipe and the walls of the wellbore, whereby the drilling mud is displaced, and the cement slurry sets into a hardened mass (i.e., sheath) and thereby seals the annulus.

The present inventors believe that the above-described water-soluble functionalized polyamine is suitable for use as a clay mitigating agent in aqueous wellbore drilling fluid (mud) compositions and/or wellbore cementing compositions. Among the advantages or purposes of doing this is to stabilize argillaceous formations like shales and/or clays in the wellbore which could otherwise be weakened and displaced by water in the aqueous wellbore mud. Because of the saturation and low permeability of a shale formation, penetration of a small volume of wellbore fluid into the formation can result in a considerable increase in pore fluid pressure near the wellbore wall, which, in turn, can reduce the effective cement support, which leads to a less stable wellbore condition.

Thus, the present invention also concerns a method for servicing a wellbore comprising: introducing to a wellbore formation an aqueous wellbore servicing fluid (e.g., drilling mud, spacer fluid, mud displacement fluid, cementing composition, or combination thereof) comprising a water-soluble functionalized polyamine comprising a water-soluble polyamine formed by reacting at least one of the amine compounds represented by the structural formulae (A) through (C) below with an epoxy compound represented by the structural formula (D) below:

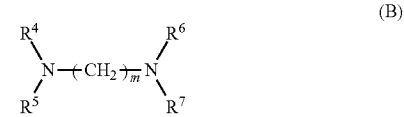

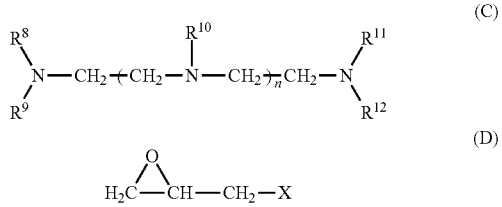

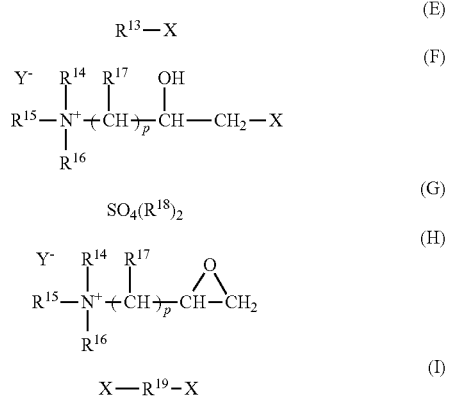

wherein $R^1$ to $R^{12}$ each independently represent hydrogen or a $C_1$ to $C_3$ alkyl group; "m" and "n" each independently represent an integer of 1 to 6; "X" represents chlorine, bromine, iodine atom, or mixture thereof; and the molar ratio of hydrogen bonded to nitrogen of said amine compound to the epoxy group of said epoxy compound is from 50:50 to 75:25;

wherein said water-soluble polyamine is being functionalized using at least one functionalizing agent selected from the following compounds: halide compounds represented by structural formulae (E) and (F) below; sulfate compounds represented by structural formula (G) below; epoxy compounds represented by structural formula (H) below; and dihalide compounds represented by formula (I) below $$R^{13}-X \quad (E)$$

$$\text{(F)} \quad Y^- \quad R^{15}-\overset{R^{14}}{\underset{R^{16}}{N^+}}\text{-}(CH)_{\overline{p}}\overset{R^{17}}{\underset{}{CH}}-CH_2-X$$

$$SO_4(R^{18})_2 \quad (G)$$

$$\text{(H)} \quad Y^- \quad R^{15}-\overset{R^{14}}{\underset{R^{16}}{N^+}}\text{-}(CH)_{\overline{p}}\overset{R^{17}}{\underset{}{CH}}-CH_2$$

$$X-R^{19}-X \quad (I)$$

wherein $R^{13}$ to $R^{16}$ each independently represent an aliphatic or aromatic, saturated or unsaturated, $C_1$ to $C_{16}$ alkyl group; $R^{17}$ represents a hydrogen, $C_1$ to $C_5$ alkyl, hydroxyalkyl, alkylene or aryl group; $R^{18}$ represents a $C_1$ to $C_3$ alkyl group; $R^{19}$ represents a linear, branched or cyclic, $C_1$ to $C_{10}$ alkylene or arylene group, "X" represents a chlorine, bromine, iodine atom, or mixtures thereof; "$Y^-$" represents a chloride, bromide, or iodide anion; and "p" represents an integer of 1 to 16; and wherein the dry weight ratio of said polyamine to said functionalizing agent is from 99.5:0.5 to 75:25.

In addition to the water-soluble functionalized polyamine, the exemplary drilling mud or cementing composition can further contain conventional cementitious compositions, surfactants, or combinations thereof. For example, the cementitious composition may comprise a cement such as a hydraulic cement (as previously defined above), and this cement may include calcium, aluminum, silicon, oxygen, and/or sulfur and which sets and hardens by reaction with water. Examples of hydraulic cements include but are not limited to Portland cements (e.g., classes A, C, G, and H Portland cements), pozzolan cements, high alumina cements, silica cements, high alkalinity cements, and combinations thereof.

While the invention is described herein using a limited number of embodiments, these specific embodiments are not intended to limit the scope of the invention as otherwise described and claimed herein. Modification and variations from the described embodiments exist. More specifically, the following examples are given as a specific illustration of embodiments of the claimed invention. It should be understood that the invention is not limited to the specific details set forth in the examples. All parts and percentages in the examples, as well as in the remainder of the specification, are by percentage dry weight unless otherwise specified.

EXAMPLE 1

A 2 L flask equipped with a condenser, a thermometer, a mechanical stirrer, and an addition funnel was charged with 60% aqueous dimethylamine (DMA, 432 g) and water (187 g). Into the flask, 456 g of epichlorohydrin (EPI) was added slowly over 3 hours while maintaining the temperature between 70°-80° C. An additional 24 g of epichlorohydrin was charged over 2 hours at 80° C. The resulting condensate ("EPI-DMA") was thereafter functionalized with a specific amount of 65% aqueous solution of the functionalizing agent, namely 3-chloro-2-hydroxypropyl trimethylammonium chloride ("CHPTMAC"), by reacting them for 30 minutes at 80° C. Thereafter, water was added to obtain an aqueous solution. These amounts are reflected in Table 1.

The viscosity (in centipoise) of a 50% aqueous solution of the resulting polymer was measured using Brookfield viscometer model DV-II+, spindle LV-1 at 60 rpm, 25° C. The weight-average molecular weight (Mw) and number-average molecular weight (Mn) were measured by aqueous gel permeation chromatography (GPC) with refractive index detection using poly(ethylene glycol) as standard. The GPC conditions are as follows: two TSK-gel PWXL-CO columns (G3000 and G5000), column temperature at 35° C., 0.8 wt % aqueous solution of sodium nitrate as elution solvent, injection volume of 50 μL, and flow rate of 0.6 mL/min.

Using the above procedure, the following polymers were synthesized, designated as "CMA-#" (to indicate Clay Mitigation Agent sample with number), and summarized in Table 1.

TABLE 1

| Description | EPI-DMA (g) | CHPTMAC (g) | Viscosity (cP) | Mw | Mn |
| --- | --- | --- | --- | --- | --- |
| Control-1 | 100 | 0.0 | 8.4 | 8300 | 5300 |
| CMA-1 | 100 | 1.05 | 8.1 | 8300 | 5400 |
| CMA-2 | 100 | 2.63 | 8.4 | 9000 | 5600 |
| CMA-3 | 100 | 5.26 | 9.2 | 8800 | 5500 |

EXAMPLE 2

The performance of the functionalized polyamines was evaluated in concrete using sand doped with clay and was compared to a control, non-functionalized EPI-DMA material.

The concrete mix design included the following components: Cement—445 kg/m³ with an alkali equivalent of 0.49% and a free calcium oxide content of 1.39%; Sand—884 kg/m³; Clay—sodium montmorillinite, 1.149 g/m³ (0.13% solids/sand); Stone—886 kg/m³; Water—190 kg/m³ for a water-to-cement ratio of 0.427; Polycarboxylate superplasticizer formulated with a defoamer—0.145 wt % solids/ cement. The dosage for the functionalized and non-functionalized polyamines was 10 wt % solids/clay.

The mixing procedure was as follows: (1) mix sand, clay, ⅓ of mixing water and clay mitigating agent (functionalized or non-functionalized polyamine) together for five minutes; (2) add stone and mix for one minute; (3) add cement and remaining water and mix for 2 minutes; (4) add polycarboxylate superplasticizer and mix for 2 minutes; (5) stop mixer and rest for 3 minutes; (6) re-mix for 2 minutes. After mixing, the slump flow (diameter of the spread), air content, and the 1-, 7-, and 28-day compressive strength of the concrete were determined. The results are shown in Table 2.

TABLE 2

| Clay Mitigating Agent | Slump Flow (mm) | Air (%) | Compressive Strength (MPa) at | | |
|---|---|---|---|---|---|
| | | | 1 day | 7 day | 28 day |
| Control-1 | 540 | 2.1 | 23 | 42 | 47 |
| CMA-1 | 550 | 2.2 | 24 | 43 | 48 |
| CMA-2 | 590 | 2.2 | 23 | 42 | 48 |
| CMA-3 | 580 | 2.2 | 23 | 42 | 48 |

As shown in Table 2, the functionalized polyamines of the invention clearly exhibit clay mitigating effect as they provide an increase in slump-flow workability as compared to the control while maintaining the compressive strength at all ages.

EXAMPLE 3

To further demonstrate the effectiveness of the invention, concrete tests were performed to determine the dosage required to achieve equal workability.

The mix design and protocol were identical to those of Example 2 except that the dosages of clay mitigating agents were varied. The control polyamine was tested from 5% to 10% solids/clay while the functionalized polyamine CMA-2 was tested from 3% to 9% solids/clay. Dosages were adjusted to achieve similar slump values. Table 3 presents three slump ranges along with the required dosages and the dosage reduction enabled by the functionalized polyamine of the invention.

TABLE 3

| Slump Flow (mm) | Required Dose (% of clay) of | | Dose Reduction (%) |
|---|---|---|---|
| | Control-1 | CMA-2 | |
| 510-520 | 5.0 | 3.0 | 40 |
| 600-610 | 7.8 | 6.0 | 24 |
| 660-670 | 10.0 | 8.5 | 15 |

The results in Table 3 clearly indicate that CMA-2 of the invention is 15% to 40% more effective as a clay mitigating agent than the control in terms of achieving similar slump flow in the concrete.

EXAMPLE 4

Using the synthetic procedure of Example 1 and benzyl chloride (BZC) as functionalizing agent, the following clay mitigating agents were synthesized and shown in Table 4.

TABLE 4

| Description | EPI-DMA (g) | BZC (g) | Viscosity (cP) | Mw | Mn |
|---|---|---|---|---|---|
| Control-2 | 100 | 0.0 | 8.4 | 8300 | 5300 |
| CMA-4 | 100 | 0.5 | 10.9 | 10400 | 6500 |
| CMA-5 | 100 | 1.2 | 12.0 | 12300 | 7400 |
| CMA-6 | 100 | 2.3 | 12.3 | 12200 | 7200 |

EXAMPLE 5

Using the concrete testing procedure of Example 2, polyamines functionalized with benzyl chloride were evaluated and the test results are illustrated in Table 5.

TABLE 5

| Clay Mitigating Agent | Slump Flow (mm) | Air (%) | CompressiveStrength (MPa) at | | |
|---|---|---|---|---|---|
| | | | 1 day | 7 day | 28 day |
| Control-2 | 540 | 2.1 | 23 | 42 | 47 |
| CMA-4 | 580 | 2.2 | 23 | 41 | 48 |
| CMA-5 | 590 | 2.1 | 23 | 43 | 48 |
| CMA-6 | 600 | 2.1 | 23 | 43 | 49 |

As shown in Table 5, polyamines of the present invention functionalized with benzyl chloride provide evidence of higher slump flow performance compared to the control, thus confirming clay mitigating effects.

EXAMPLE 6

The benefit to asphalt and road base construction aggregates was evaluated through the determination of the plasticity index. Model soils comprised of clay and sand were treated with both a functionalized polyamine and a non-functionalized polyamine and compared to a non-treated soil sample.

The model soil sample included the following components: unground silica—150 g with 100% passing No. 40 sieve (425 microns); and clay—sodium montmorillinite, 50 g. The first sample was left untreated, while the second sample was treated with 5% solids/clay non-functionalized polyamine Control-1. Next, the third sample was treated with 4 wt % solids/clay functionalized polyamine CMA-2. Finally, the fourth and fifth samples were treated with 10 wt % solids/clay of both the non-functionalized and functionalized polyamines respectively.

The plasticity index was determined following the British Standard 1377:2. The plasticity index is calculated as the liquid limit minus the plastic limit. The liquid limit was determined using the cone penetrometer method while the plastic limit was determined using a rolling device. A lower plasticity index is typically indicative of improved adhesion between the aggregate and binder for asphalt and lower susceptibility to frost-heave in road base. The results are shown in Table 6.

TABLE 6

| Clay Mitigating Agent | Dosage (% solids/clay) | Plasticity index (%) |
|---|---|---|
| None | 0 | 22 |
| Control-1 | 5 | 11 |
| CMA-1 | 4 | 11 |

TABLE 6-continued

| Clay Mitigating Agent | Dosage (% solids/clay) | Plasticity index (%) |
|---|---|---|
| Control-1 | 10 | NP |
| CMA-1 | 10 | NP |

As shown in Table 6, at a 20% reduced dosage, the functionalized polyamine exhibits the same plasticity performance as the non-functionalized polyamine. Both chemicals show a clear improvement over the non-treated model soil. At 10 wt %, both treatments render the soil non-plastic (NP).

EXAMPLE 7

To demonstrate the effectiveness of the invention in aqueous wellbore drilling fluid (mud) compositions and/or wellbore cementing compositions, a filtration method was performed to determine the ability of different clay solutions to absorb water. Three solutions were tested: one without any treatment, one treated with a non-functionalized polyamine and the last treated with a functionalized polyamine.

The clay solution included the following components: distilled water—400 g; and clay—sodium montmorillinite, 8 g. The first sample was left untreated, while the second sample was treated with 10% solids/clay non-functionalized polyamine Control-1. Lastly, the third sample was treated with 10 wt % solids/clay functionalized polyamine CMA-2.

The absorption capacity of the clay was determined by a filtration method similar to one described in U.S. Pat. No. 5,099,923. For the treated samples, the chemical is added to the water and mixed by an overhead stirrer at 600 rpm for 5 minutes. Afterwards, the clay is added and mixed for an additional 5 minutes. For the untreated sample, the clay was added to the water and mixed at 600 rpm for 5 minutes to provide a clay slurry. This slurry is then filtered over a hardened filter paper equivalent to Whatman™ Filter Paper #50. A low pressure vacuum (9.7 psi) was applied and the time required to achieve various total volumes of water passing the filter was recorded. The data was plotted against (time)$^{1/2}$ and a slope value was calculated for each trial in units of mL/(time)$^{1/2}$. Larger slopes indicate enhanced swelling inhibition. The results are shown in Table 7.

TABLE 7

| Clay Mitigating Agent | Dosage (% solids/clay) | Time to 75 mL (sec) | Slope mL/(sec)$^{1/2}$ |
|---|---|---|---|
| None | 0 | 1512 | NA |
| Control-1 | 10 | 105 | 10.7 |
| CMA-1 | 10 | 30 | 23.5 |

As shown in Table 7, the functionalized polyamine exhibits improved swelling inhibition over the non-functionalized polyamine. A slope for the untreated slurry was not calculated because only one reading was taken at 75 mL. The rate of filtration was noticeably slower as indicated by the time to 75 mL, so no further readings were taken.

The foregoing examples and embodiments were presented for illustrative purposes only and not intended to limit the scope of the invention.

It is claimed:

1. A method for mitigating the effects of clay in aggregates, comprising:

introducing to clay contained in a plurality of aggregates, in an amount of 2% to 25% by weight based on dry weight of the clay contained in said aggregates, a water-soluble functionalized polyamine comprising a water-soluble polyamine formed by reacting at least one of the amine compounds represented by the structural formulae (A) through (C) below with an epoxy compound represented by the structural formula (D) below:

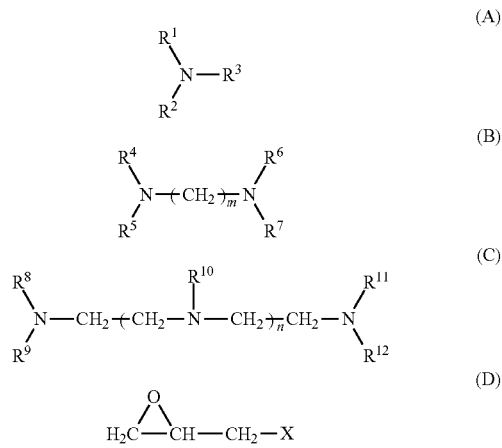

wherein R1 to R12 each independently represent hydrogen or a $C_1$ to $C_3$ alkyl group; "m" and "n" each independently represent an integer of 1 to 6; "X" represents chlorine; and the molar ratio of hydrogen bonded to nitrogen of said amine compound to the epoxy group of said epoxy compound is from 50:50 to 75:25;

wherein said water-soluble polyamine is functionalized with 3-chloro-2-hydroxypropyl trimethyl-ammonium chloride as a functionalizing agent; and wherein the dry weight ratio of said polyamine to said functionalizing agent is from 99.5:0.5 to 75:25.

2. The method of claim 1 wherein said aggregates are selected from mortar aggregates, concrete aggregates, asphalt aggregates, and road base aggregates.

3. The method of claim 1 wherein said water-soluble functionalized polyamine is introduced to clay contained in a plurality of aggregates in an amount of 1% to 50% by weight based on dry weight of the clay contained in said aggregates.

4. The method of claim 1 wherein said amine compound is represented by structural formula (A) and comprises an ammonia, methylamine, ethylamine, propylamine, dimethylamine, diethylamine, dipropylamine, methyl ethyl amine, methyl propyl amine, ethyl propyl amine, or mixture thereof.

5. The method of claim 4 wherein said amine compound is dimethylamine.

6. The method of claim 1 wherein said amine compound is represented by structural formula (B) and comprises ethylene diamine, 1,3-propylene diamine, 1,4-butylene diamine, 1,5-pentamethylene diamine, 1,6-hexamethylene diamine, or mixture thereof.

7. The method of claim 6 wherein said amine compound comprises ethylene diamine, hexamethylene diamine, or mixture thereof.

8. The method of claim 1 wherein said amine compound is represented by structural formula (C) and comprises diethylene triamine, triethylene tetramine, tetraethylene pentamine, or mixture thereof.

9. The method of claim 8 wherein said amine compound is tetraethylene pentamine.

10. The method of claim 1 wherein said amine compound is a mixture of dimethylamine and ethylene diamine in the molar ratio of 99.9:0.1 to 90:10.

11. The method of claim 1 wherein said amine compound is a mixture of dimethylamine and tetraethylene pentamine in the molar ratio of 99.9:0.1 to 92:8.

12. The method of claim 1 wherein said weight ratio of said polyamine to said functionalizing agent is from 99:1 to 85:15.

13. The method of claim 12 wherein said weight ratio of said water-soluble polyamine to said functionalizing agent is from 99:1 to 90:10.

14. The method of claim 1 wherein said water-soluble functionalized polyamine has a Brookfield viscosity of 2 to 500 centipoise at 50 wt % aqueous solution as measured at 60 rpm and 25° C. with a Brookfield Viscometer model DV-II+, spindle LV-1.

15. An aggregate composition provided by the method of claim 1.

16. An aggregate composition comprising:
a plurality of clay-bearing aggregates selected from the group of natural and/or manufactured sand, crushed stone, crushed gravel, crushed rock, crushed shale, or mixtures thereof; and, in an amount of 2% to 25% by weight based on dry weight of the clay contained in said aggregates,
a water-soluble functionalized polyamine comprising a water-soluble polyamine formed by reacting at least one of the amine compounds represented by the structural formulae (A) through (C) below with an epoxy compound represented by the structural formula (D) below:

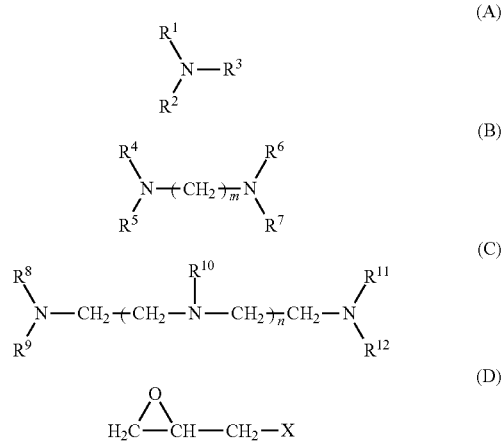

wherein R1 to R12 each independently represents hydrogen or a Cl to C3 alkyl group; "m" and "n" each independently represent an integer of 1 to 6; "X" represents chlorine; and the molar ratio of hydrogen bonded to nitrogen of said amine compound to the epoxy group of said epoxy compound is from 50:50 to 75:25;
wherein said water-soluble polyamine is functionalized using 3-chloro-2-hydroxypropyl trimethylammonium chloride as a functionalizing agent; and
wherein the dry weight ratio of said polyamine to said functionalizing agent is from 99:1 to 75:25.

17. Method for modifying a hydratable cementitious composition comprising: combining a hydratabe coment with said aggregate composition of claim 16.

18. A method for modifying a hydratable cementitious composition containing clay-bearing aggregates, comprising: introducing to clay-bearing aggregates an admixture composition comprising:
at least one chemical admixture selected from the group of water reducing agents, set retarders, set accelerators, defoamers, air entraining agents, surface active agents, and mixtures thereof; and
a water-soluble functionalized polyamine comprising a water-soluble polyamine formed by reacting at least one of the amine compounds represented by the structural formulae (A) through (C) below with an epoxy compound represented by the structural formula (D) below:

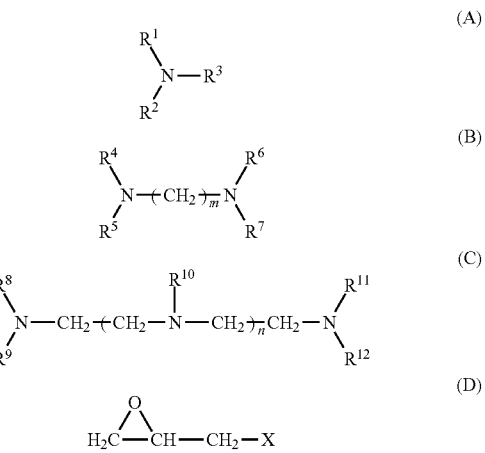

wherein R1 to R12 each independently represent hydrogen or a $C_1$ to $C_3$ alkyl group; "m" and "n" each independently represent an integer of 1 to 6; "X" represents chlorine; and the molar ratio of hydrogen bonded to nitrogen of said amine compound to the epoxy group of said epoxy compound is from 50:50 to 75:25;
wherein said water-soluble polyamine is functionalized using 3-chloro-2-hydroxypropyl trimethylammonium chloride as a functionalizing agent; "X" represents a chlorine; and
wherein the dry weight ratio of said polyamine to said functionalizing agent is from 99:1 to 85:15.

19. A method for mitigating the effects of clay in aggregates, comprising:
introducing to clay contained in a plurality of aggregates, in an amount of 2% to 25% by weight based on dry weight of the clay contained in said aggregates, a water-soluble functionalized polyamine comprising a water-soluble polyamine formed by reacting at least one of the amine compounds represented by the structural formulae (A) through (C) below with an epoxy compound represented by the structural formula (D) below:

-continued

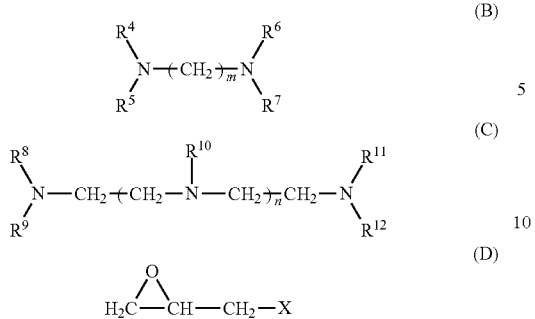

wherein R1 to R12 each independently represent hydrogen or a $C_1$ to $C_3$ alkyl group; "m" and "n" each independently represent an integer of 1 to 6; "X" represents chlorine; and the molar ratio of hydrogen bonded to nitrogen of said amine compound to the epoxy group of said epoxy compound is from 50:50 to 75:25;

wherein said water-soluble polyamine is functionalized with the following compound represented by the structural formula (H):

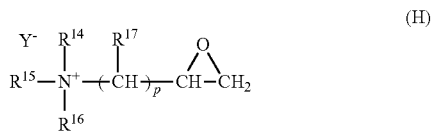

wherein R14 to R16 each independently represent an aliphatic or aromatic, saturated or unsaturated, $C_1$ to $C_{16}$ alkyl group; R17 represents a hydrogen, $C_1$ to $C_5$ alkyl, hydroxyalkyl, alkylene or aryl group; "Y−" represents a chloride, bromide, or iodide anion; and "p" represents an integer of 1 to 16; and wherein the dry weight ratio of said polyamine to said functionalizing agent is from 99.5:0.5 to 75:25.

* * * * *